United States Patent [19]
Oshima

[11] Patent Number: 4,566,549
[45] Date of Patent: Jan. 28, 1986

[54] WEIGHING HOPPER CLEANING DEVICE

[75] Inventor: Yasushi Oshima, Akashi, Japan

[73] Assignee: Yamato Scale Company, Limited, Japan

[21] Appl. No.: 592,418

[22] Filed: Mar. 23, 1984

[30] Foreign Application Priority Data

Mar. 28, 1983 [JP] Japan .................................. 58-45505

[51] Int. Cl.$^4$ ...................... G01G 13/18; G01G 19/00; G01G 23/00
[52] U.S. Cl. .................................. 177/245; 177/105; 15/301
[58] Field of Search ............................. 15/300 R, 301; 177/105–114, 245

[56] References Cited

U.S. PATENT DOCUMENTS

| 3,400,775 | 9/1968 | Mackenzie et al. | 177/108 X |
| 3,642,128 | 2/1972 | Westwood et al. | 177/50 X |
| 4,134,466 | 1/1979 | Steele | 177/114 |
| 4,344,492 | 8/1982 | Hirano | 177/25 |
| 4,393,950 | 7/1983 | Klopfenstein et al. | 177/108 |

FOREIGN PATENT DOCUMENTS 2003284  3/1979  United Kingdom ................ 177/114

*Primary Examiner*—E. A. Goldberg
*Assistant Examiner*—Patrick W. Foster
*Attorney, Agent, or Firm*—Senniger, Powers, Leavitt and Roedel

[57] ABSTRACT

A novel device to be attached to each weighing hopper of a combination weighing machine is provided for cleaning the hopper by applying an air jet to the inside of the hopper for a short time just after every unloading of the hopper to blow off possible fragments of product weighed sticking to and accumulating on the inner wall of the hopper to affect the tare and, consequently, the combined weight.

4 Claims, 4 Drawing Figures

WEIGHING HOPPER CLEANING DEVICE

This invention relates generally to a combination weighing machine, and especially to a novel device for forcibly removing possible fragments of weighed product, which stick to and accumulate on the inner wall of each weighing hopper of the machine to affect the tare and, consequently, the combined weight of product.

U.S. Pat. No. 4,344,492 discloses a combination weighing machine including a plurality of weighing units each having an automatically loaded and unloaded weighing cradle or hopper. This weighing hopper is of "bottom-discharge" type and has a flapdoor type discharge gate at its bottom opening. Some examples of such weighing hopper are shown in the pending U.S. patent application Ser. No. 537,036 filed Sept. 29, 1983.

In operation of the combination weighing machine, each hopper is repeatedly unloaded and loaded with product by means of feeding and gate control devices as described in the above-cited patent. During such operation, fragments of the product may stick to and accumulate on the inner wall of each weighing hopper. This is especially severe when the weighed products are cakes or candies in bare state. Such accumulation of fragments, of course, increases the tare of weighing, shifts the zero-point of balance and, consequently affects the combined weight of product. In order to avoid such erroneous measurement, the above-cited U.S. Pat. No. 4,344,492 provides an automatic zero-point correction device which can correct the zero-point of each weighing balance before every weighing operation in automatic fashion. Though this correction device has removed the abovementioned problem of tare variation, it has undesirably increased the cost and complexity of the control circuit of each weighing unit. Without such expensive device, the only way to avoid the problem is to clean each hopper manually and frequently by disabling the corresponding weighing unit during operation of the machine. However, this is very troublesome and time-consuming work.

Accordingly, an object of this invention is to provide an improved device for cleaning each weighing hopper of combination weighing machine automatically just after unloading of the hopper.

According to this invention, provided is a device for cleaning the interior of a weighing hopper having a discharge gate, which comprises at least one air jetting nozzle directed to the inside of the hopper and means for supplying compressed air to the nozzle. Further means are provided for controlling the air supplying means to jet the air from the nozzle for a predetermined time period during opening of the discharge gate.

These and other features and operation of this invention will be described in more detail hereinunder with reference to the accompanying drawings.

Figure 1:
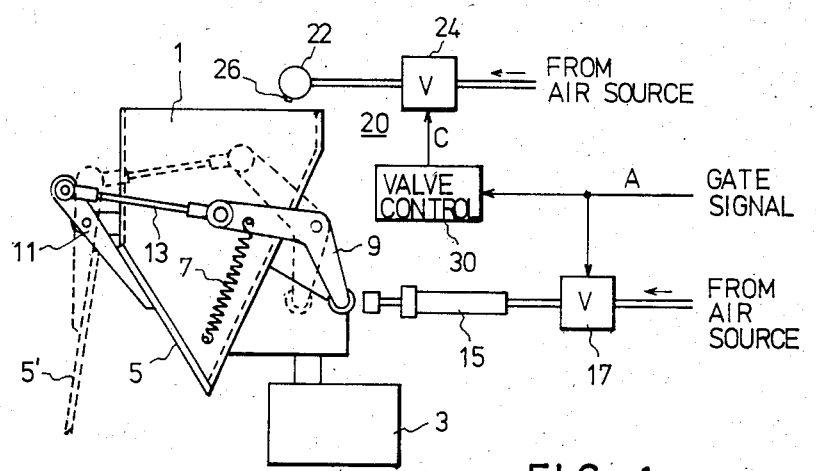
FIG. 1 is a schematic diagram of a typical weighing hopper provided with a cleaning device according to this invention.

Referring to FIG. 1, there is shown a typical example of a weighing hopper 1 which is cited in the abovementioned pending application. The hopper 1 is supported on a weighing device 3 for sensing the weight of articles loaded in the hopper 1 to produce an electric signal indicative of this weight. The weighing device 3 may be of any type suitable for use as described, for example, in the paper of Yano and Kawahara entitled "On The Recent Electronic Weighing Devices", in INSTRUMENTATION, vol. 32, No. 4 (1983) pp. 210–215.

The weighing hopper 1 is provided with a flapdoor type discharge gate 5 at its bottom opening, which is normally closed by means of a spring 7 through a link mechanism including levers 9 and 11 and a connecting link 13 therebetween. The gate is arranged to open as shown by dashed lines 5' in response to actuation of an air cylinder 15 having a plunger facing the input end of the lever 9. The air cylinder 15 is connected to a compressed air source (not shown) through an electromagnetic valve 17 which is controlled by a gate signal, such as signal A of FIG. 3, supplied from a control circuit (not shown) as described in detail in the aforementioned U.S. Pat. No. 4,344,492.

Figure 2:
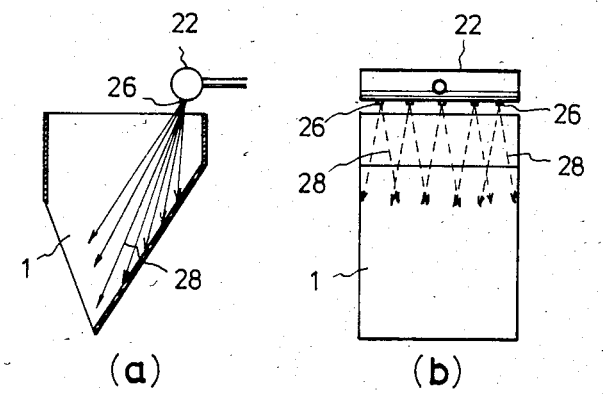
FIGS. 2a and 2b are sectional side and back views representing the air jet pattern of the device of this invention.

The weighing hopper 1 is also provided with a cleaning device 20 according to this invention, which comprises a distributor or manifold 22 connected through another electromagnetic valve 24 to a suitable compressed air source (not shown) which may be of well known type including an air compressor, a pressure regulator and an air filter. As shown more specifically in FIGS. 2a and 2b, the manifold 22 is disposed above the upper opening of the hopper 1 and provided with a plurality of air jetting nozzles 26 which are directed to the inside of the hopper 1 so that the air jets therefrom are forced against the bottom surface of the hopper 1 to blow off possible fragments of articles deposited thereon out of the discharge opening, as shown by arrows 28.

Figure 3:
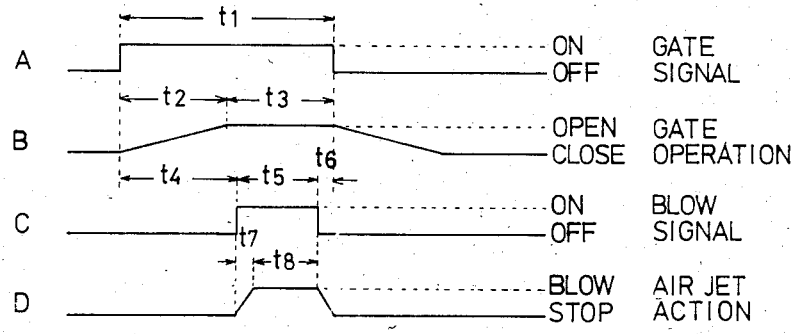
FIG. 3 is a timing diagram presented in aid of explanation of the operation of this inventive device.

The cleaning device 20 of this invention also includes a valve control circuit 30 which is responsive to the gate signal A for providing a blow signal, such as signal C of FIG. 3, to the electromagnetic valve 24. Assuming now that the gate signal A has a duration t1, for example, the gate 5 begins to open at the leading edge of the signal A and opens fully after time t2. Thereafter, it is kept open for time t3 and, then, begins to close at the trailing edge of the signal A, as shown in FIG. 3B. The valve control circuit 30 is arranged, for example, to produce a blow signal C having a leading edge delaying by time t4 from the leading edge of the gate signal A, a duration t5 and a trailing edge leading the trailing edge of the signal A by time t6, as shown in FIG. 3C. Thus, the air blow starts at the leading edge of the blow signal C and reaches maximum intensity after time t7. Thereafter, it conserves this intensity for time t8 and begins to decay at the trailing edge of the signal C.

The diameter d of air nozzle 26, pressure p of air and times t1 to t8 are selected so that the air jet starts just after completion of discharge of articles from the hopper 1 and ends before the gate 5 is closed and the residual fragments of articles are completely removed within this short period of time. In the illustrative embodiment, these values were selected as follows.

d = 1.5 millimeter,
p = 2–5 killograms/square centimeter,
t1 = 200 milliseconds,
t2 = t3 = t4 = 100 milliseconds,
t5 = 80 milliseconds,
t6 = t7 = 20 milliseconds, and
t8 = 60 milliseconds.

I claim:

1. A weighing hopper having a discharge gate, gate control means responsive to a gate control signal for opening the gate for unloading of product from the hopper, at least one air jetting nozzle directed toward the interior of the hopper, and jetting nozzle control means responsive to said gate control signal to initiate operation of said air jetting nozzle to blow air into the interior of the hopper only after a predetermined delay following opening of the gate sufficient to permit completion of unloading of product from the hopper whereby said nozzle is adapted to blow air into the interior of the hopper after it has unloaded to clean it.

2. A weighing hopper as set forth in claim 1 wherein said gate control means is adapted to maintain the gate open for a predetermined time interval before the gate begins to close, and said air jetting nozzle control means is adapted for stopping operation of said air jetting nozzle prior to the end of said predetermined time interval and before the gate begins to close.

3. A weighing hopper as set forth in claim 1 or 2 wherein said air jetting nozzle control means comprises an electromagnetic valve for controlling the supply of compressed air and valve control means responsive to said gate control signal to produce a signal for controlling said electromagnetic valve.

4. A weighing hopper as set forth in claim 1 wherein said hopper has an open top, a discharge outlet, and a sloping bottom surface down which product is adapted to slide to the outlet for discharge from the hopper, said air jetting nozzle being mounted above the open top of the hopper in a position for blowing air down into hopper for impact against said sloping bottom surface thereby to clean the surface.

* * * * *